United States Patent [19]
Ward

[11] Patent Number: 4,767,055
[45] Date of Patent: Aug. 30, 1988

[54] METHOD AND LINKAGE FOR POSITIONING A CONVERGENT FLAP AND COAXIAL ARC VALVE

[75] Inventor: Eric J. Ward, W. Palm Beach, Fla.

[73] Assignee: United Technologies Corporation, Hartford, Conn.

[21] Appl. No.: 30,794

[22] Filed: Mar. 27, 1987

[51] Int. Cl.$^4$ ............................................. B64C 15/00
[52] U.S. Cl. .......................... 239/265.29; 244/110 B; 60/228; 239/11
[58] Field of Search ...................... 239/265.19, 265.25, 239/265.27, 265.29, 265.39; 60/226.1, 226.2, 228–230; 244/12.5, 23 D, 110 B

[56] References Cited

U.S. PATENT DOCUMENTS

| | | | |
|---|---|---|---|
| 3,512,716 | 5/1970 | Kopp | 239/265.29 |
| 3,558,058 | 1/1971 | Lennard et al. | 239/265.39 |
| 3,608,314 | 9/1971 | Colley | 60/226.2 |
| 3,667,680 | 6/1972 | Weed | 239/265.39 X |
| 4,052,007 | 10/1977 | Willard | 239/265.29 |
| 4,375,276 | 3/1983 | Konarski | 60/232 X |
| 4,591,097 | 5/1986 | Thayer | 239/265.29 |
| 4,605,169 | 8/1986 | Mayers | 239/265.29 |
| 4,641,782 | 2/1987 | Woodward | 239/265.29 |
| 4,690,329 | 9/1987 | Maddon | 239/265.19 |

Primary Examiner—Andres Kashnikow
Assistant Examiner—Kevin Patrick Weldon
Attorney, Agent, or Firm—Troxell K. Snyder

[57] ABSTRACT

A convergent/divergent gas turbine engine exhaust nozzle having reverse thrust capability includes a concentric flap (22) and arc valve (36) pivotable about a common axis (34). A method and linkage (48) schedule the opening of the valve (36) in response to rotation of the flap (22) into a blocking position with respect to the normally aftward flow of the exhaust gas (12). The arc valve (36) is accelerated by the linkage (48) to full opening speed prior to unsealing an alternate, thrust reversing flow passage (38).

4 Claims, 2 Drawing Sheets

METHOD AND LINKAGE FOR POSITIONING A CONVERGENT FLAP AND COAXIAL ARC VALVE

This invention was made with Government support under a contract awarded by the Department of the Air Force. The Government has rights in this invention.

FIELD OF THE INVENTION

The present invention relates to a method for scheduling and coordinating the movement of a convergent flap in a gas turbine engine exhaust nozzle and the opening of an arc valve therein.

BACKGROUND

It is common in thrust vectoring exhaust nozzles for gas turbine engines to use flaps or other movable surfaces to direct the exhaust gases in order to produce the desired thrust angle and/or exhaust nozzle flow area. In order to achieve reverse thrust, certain thrust vectoring nozzles use a combined valve-flap arrangement wherein the flow diverting flap or flaps is positioned in a blocking arrangement with regard to aftward flow of the exhaust gas while a valving surface or other structure is opened to admit the exhaust gases into an alternate, generally forwardly directed flow passage.

Such reversing systems utilizing an alternate flow path and corresponding valve structure require careful coordination with the blocking flap in order to avoid reducing the total nozzle outlet flow area below a minimum area required to maintain operational stability in the gas turbine engine. If total nozzle outlet area is reduced below such minimum during a reversing maneuver, elevated back pressure at the engine exhaust could induce an engine stall or other undesirable engine instability.

In addition to the timing of the opening of the valve structure, it is also desirable that the rate at which the valve opens meet or exceed the rate at which the blocking flap closes off the aftward nozzle flow area. This is especially difficult to achieve in those nozzle arrangements wherein the valve structure remains normally at rest while the diverter flap moves through a range of orientations for achieving normal forward thrust vectoring and aftward outlet area control.

One further desirable feature for such nozzles is the provision for a safe failure mode wherein the nozzle flaps and valve structure automatically revert to an unvectored, forward thrust orientation upon failure of the nozzle actuators or associated linkages. An aircraft with a failed linkage would thus be operable in a forward thrust mode which in turn enhances the likelihood of recovery from this type of failure.

As with all aircraft components and especially for thrust vectoring nozzles, the weight and complexity of the physical hardware is of prime importance to the designer, with the lightest and simplest arrangement being favored from cost, weight, and reliability standpoints.

SUMMARY OF THE INVENTION

It is therefore an object of the present invention to provide a method and means for coordinating the positioning of a flow directing flap and a flow regulating valve in a thrust vectoring exhaust nozzle for a gas turbine engine.

It is further an object of the present invention to coordinate the opening of the valve responsive to the movement of the flow directing flap.

It is further an object of the present invention to schedule the opening rate of the valve with respect to the current rate of change of the aftward nozzle outlet flow area in order to avoid inducing instability in the operation of the gas turbine engine.

It is still further an object of the present invention to accelerate the valve between a static dwell state, in which the valve remains closed and motionless in response to movement of the flap within a normal operating range, and an opening state wherein the valve opens at a rate in excess of the flap closing rate.

It is still further an object of the present invention to accelerate the valve to its full opening speed prior to admitting any exhaust gases into the reversing flow passage.

According to the present invention, an exhaust nozzle having a pivotable semi-cylindrical arc valve for regulating the flow of exhaust gases into a reverser flow passage or the like is held in a closed, sealed state during movement of a coaxial convergent flap structure through a range of motion corresponding to normal, forward nozzle thrust operation. The arc valve is accelerated from rest to an opening angular speed which is in excess of the rate of movement of the convergent flap as the flap is moved into a blocking orientation with respect to the aftward flow of the engine exhaust. Such acceleration is accomplished while maintaining the arc valve in a closed state with respect to the admission of exhaust gas into the reverser flow passage controlled by the valve.

As the convergent flap reaches a position wherein further movement thereof would otherwise result in an unacceptably small nozzle outlet flow area, the now accelerated arc valve, moving at the full desired opening speed, opens to admit at least a portion of the engine exhaust gas into the alternate flow passage, maintaining the total nozzle outlet flow area as the diverter flap continues to move into a final position substantially blocking all aftward exhaust flow.

The present invention also provides a simple linkage for accomplishing the foregoing operation, including a cam race movable with the flow diverting flap and a four bar linkage driven by a roller engaged with the cam race. The linkage drives a crank secured to the arc valve causing the movement of said valve to be wholly responsive to movement of the convergent flap. The linkage according to the present invention accomplishes the desired operation of the arc valve without a separate actuator or other driving means, thereby simplifying the overall nozzle mechanism and increasing the reliability thereof.

Another advantage of the linkage and cam arrangement of the present invention is the continuing "fail open" bias maintained by the internal nozzle pressure on the convergent flap. Failure of the flap driving actuator, for example, causes the convergent flap to open, simultaneously closing the arc valve and unblocking the aftward flow path. The nozzle is thus restored to normal, forward thrust, or maintained in this state if the failure occurs during normal flight.

These advantages as well as others will be apparent to those skilled in the relevent art upon review of the following specification and the appended claims and drawing figures.

DETAILED DESCRIPTION OF THE PREFERRED EMBODIMENT

Figure 1:
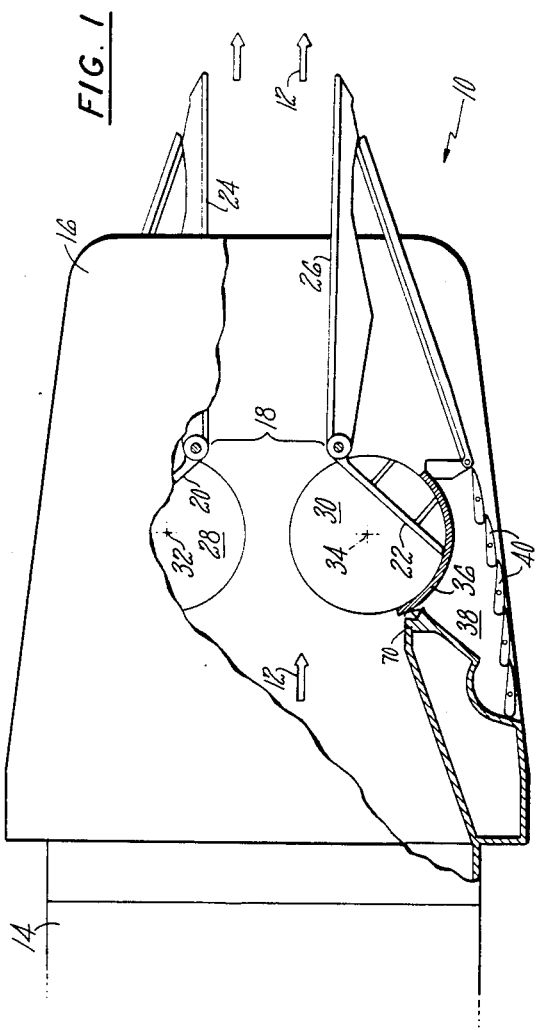
FIG. 1 shows a cutaway side view of a two dimensional thrust vectoring exhaust nozzle having a convergent flap and a concentric, semi-cylindrical arc valve.

FIG. 1 shows a two dimensional thrust vectoring exhaust nozzle 10 receiving a flow of exhaust gases 12 from a gas turbine engine 14 for propelling an aircraft (not shown). The nozzle 10 is termed "two dimensional" by virtue of its ability to direct the exhaust gases 12 over a range of outlet vectors lying in a single plane. The nozzle 10 of FIG. 1 thus, by movement of the various flaps in a fashion well known in the prior art, may direct the exhaust gases generally upward, downward, or in a reverse thrust direction.

Not only does the nozzle shown in FIG. 1 provide for vectoring of the exhaust gas flow 12, but it additionally provides for the control of the aftward nozzle outlet flow area as measured by the throat distance 18 between a pair of upper and lower convergent flaps 20, 22. The throat 18 is thus varied to match the current engine and/or afterburner power level to provide an optimum outlet flow area and exhaust velocity for engine efficiency and thrust.

Diversion of the exhaust flow 12 as well as variation of the rate of expansion of the exhaust gases are achieved by the aftward divergent flaps 24, 26 which are hinged to the trailing edges of the convergent flaps 20, 22, respectively.

In the nozzle as shown in FIG. 1, the convergent flaps 20, 22 are secured at opposite ends thereof to disks 28, 30 which are in turn pivotable about transverse axes 32, 34. The disks and hence the convergent flaps are positioned by means of hydraulic or other actuators (not shown) which selectably position the disks and flaps for control of the exhaust gas flow 12.

With further reference to FIG. 1, the nozzle 10 also includes at least one arc valve 36 having a semi-cylindrical configuration and concentrically positioned and pivotable about the corresponding convergent flap 22. The arc valve 36 regulates the flow of exhaust gas 12 into the corresponding alternate reverser flow passage 38 whence it may be directed forwardly or otherwise by a vane cascade 40 or other flow directing means.

During operation of the nozzle 10 in the reverse flow operating mode, the convergent flaps 20, 22 are pivoted into a full blocking arrangement whereby the aftward nozzle throat 18 is substantially eliminated, thereby blocking off the aftward flow of exhaust gas 12. During such operation the arc valve 36 is likewise pivoted to admit the exhaust gases 12 into the flow passage 38, thereby achieving the desired reverse thrust.

As will be appreciated by those familiar with the operation of gas turbine engines, reduction of the total nozzle outlet gas flow area below a certain minimum results in excessive back pressure at the engine outlet and possible stalling of the engine compressor or other undesirable and unstable engine operating conditions. During the transition between forward and reverse thrust, it is thus clear that the nozzle 10 must accurately and positively schedule and coordinate the movement of the closing divergent flaps 20, 22 with the opening of the arc valve or valves 36 to avoid reducing the total nozzle outlet area below the required minimum while simultaneously avoiding the loss of thrust efficiency which results from operation of the engine-nozzle combination with too large a total nozzle outlet area for the current engine power level.

Figure 2:
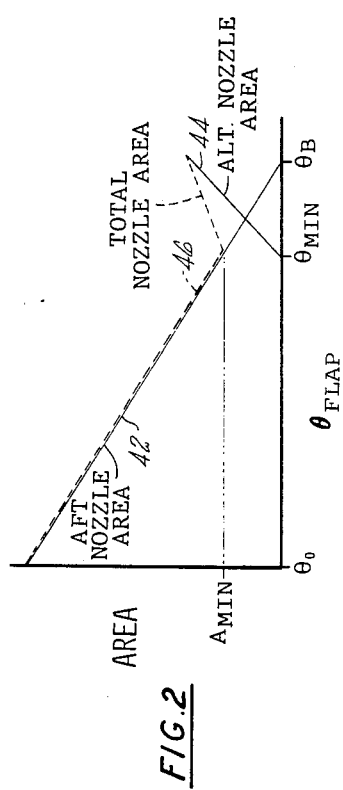
FIG. 2 shows a plot of the variation of aftward, reversing, and total nozzle gas flow area over the range of motion of the convergent flap.

One such area schedule which achieves the desired total nozzle outlet area is shown graphically in FIG. 2 wherein the flow areas 42, 44 of the aftward nozzle outlet and the alternate passage regulated by the arc valve are shown along with the total nozzle outlet area 46 indicated by the broken line. The relative area of each parameter is represented by vertical displacement on the graph of FIG. 2 while the horizontal displacement is representative of the position of the convergent flap 22 in the range defined between the fully open angular position $\theta_O$ and the fully blocked angular position $\theta_B$.

The aftward nozzle outlet area 42 is thus seen decreasing directly as the convergent flap 22 is pivoted between the open position, $\theta_O$ and the closed position $\theta_B$. The aftward nozzle area decreases, reaching the minimum allowed area $A_{min}$ at the corresponding angular position $\theta_{min}$. Continued pivoting of the convergent flap 22 past $\theta_{min}$ without providing an alternative flow path for the exhaust gases results in an increased likelihood, if not certainty, of stalling the gas turbine engine.

As can be seen from the area schedule according to the method of the present invention, the alternate passage flow area 44 is opened at $\theta_{min}$ and increases at a rate in excess of the closing of the aftward nozzle flow area as the convergent flap 22 is rotated into the full blocking position $\theta_B$. Thus at no point in the operational range of the convergent flap 22 does the total nozzle outlet area fall below $A_{min}$.

By opening the arc valve 36 at an angular speed greater than the closing rate of the convergent flap 22, the method according to the present invention provides an increasing flow area to the reverser exhaust passage 38 at a rate greater than the closing of the convergent flap throat 18 thereby increasing the total nozzle outlet area 46 as the convergent flap 22 approaches the full blocking position $\theta_B$. This schedule of area is particularly adapted to provide the nozzle 10 with the capability of smoothly switching between forward and reverse thrust operation. In transitioning between forward and reverse thrust, it is typical to reduce the power level of the gas turbine engine to a minimum with a consonant reduction in the aftward nozzle outlet flow area and then to increase engine power upon opening the reverser exhaust passage in order to achieve the desired reverse thrust.

The total nozzle outlet area 46 as provided by the method according to the present invention and shown clearly in FIG. 2 is well adapted to provide the required area for the operation of the nozzle in a forward to reverse thrust transition, providing the proper total nozzle outlet area for the exhaust gases over the expected engine operating range. The closely coordinated scheduling between the nozzle outlet area and the engine power level provides the optimum nozzle outlet area without increasing the likelihood of inducing engine stall or similar operating instabilities.

Figure 3:
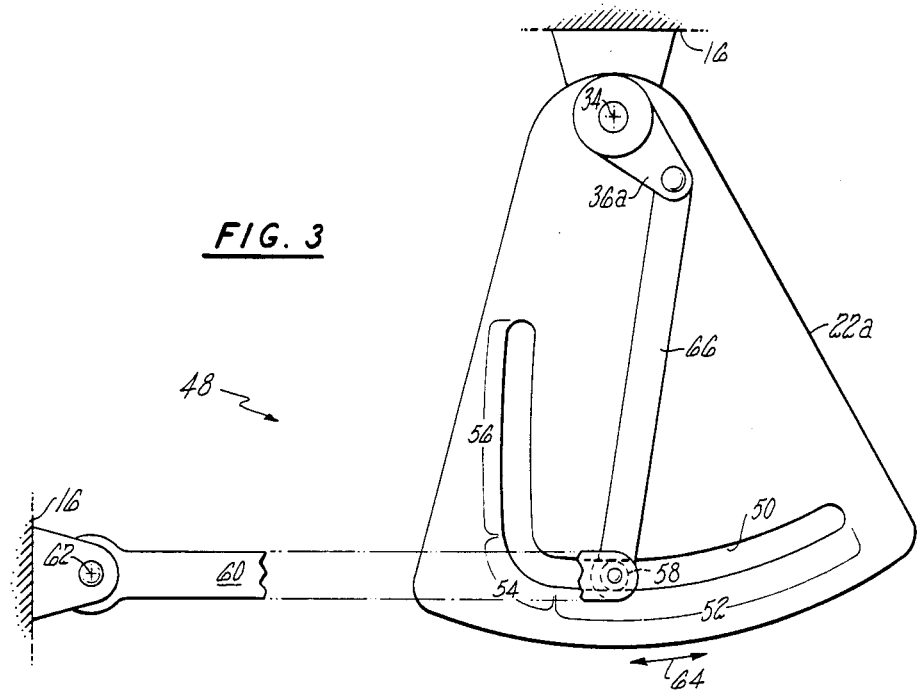
FIG. 3 shows a schematic of the cam linkage according to the present invention.

FIG. 3 shows a schematic of a linkage disposed between the convergent flap 22 and the arc valve 36 for effecting the method according to the present invention. The linkage, designated generally by reference numeral 48, moves generally in a single plane and is supported by the nozzle static structure, such as the sidewalls 16, as shown in FIG. 3. A cam race 50 is disposed within a portion of the convergent flap structure 22a and rotatable therewith about the pivot axis 34 as discussed hereinabove. The cam race 50 includes a first dwell portion 52, a second acceleration portion 54 and a third full speed or action portion 56. The dwell portion 52 is generally equidistant from the pivot 34 while the action portion 56 runs generally inwardly toward the pivot axis 34. The acceleration portion 54 forms a curved transition between the dwell and action portions 52, 56.

The arc valve 36 is positioned by the arc valve crank 36a which rotates about the common axis 34. The crank 36a is pivotably joined to a drive link 66, which is in turn connected to a slave link 60. The slave link rotates about a static pivot point 62 in the nozzle static structure 16. A roller 58 runs in the cam race 50 and is secured to the four bar linkage formed by the static structure 16, slave link 60, drive link 66, and crank 36a at the pivot joint between the drive and slave links 66, 60.

The roller 58 and cam race 50 thus drive the four bar linkage 16, 60, 66, 36a in response to the movement of the convergent flap 22. As will be appreciated from FIG. 3 and the following description, the roller 58 and hence the drive link 66 and arc valve crank 36a remain essentially static as the cam race 50 and the convergent flap structure 22, 22a rotates through the dwell portion 52 of the cam race 50 which is disposed equidistant from the transverse pivot axis 34. As the convergent flap position approaches $\theta_{min}$, the roller 58 enters the acceleration portion 54 of the cam race 50 initiating movement of the drive link 66 and arc valve crank 36a.

As the convergent flap 22 achieves an angular position equivalent to $\theta_{min}$, the roller 58 according to the present invention has traversed the acceleration portion 54 of the cam race 50 whereby the arc valve 36 is now moving at its full angular speed about the pivot axis 34 which is higher than the angular velocity of the rotating convergent flap 22, 22a.

It will be apparent from the preceding discussion that, as the convergent flap has not yet achieved $\theta_{min}$ at the time the roller 58 enters the acceleration portion 54 of the cam race 50, that some movement of the arc valve 36 takes place prior to the opening thereof for admitting exhaust gases 12 into the reverser flow passage 38. This "head start" motion allows the arc valve to achieve the desired angular velocity prior to opening and admitting exhaust gas into the passage 38 thus ensuring that the desired rate of increase of flow area in the reverser passage is achieved at the initiation of flow into said passage 38. Without providing for such preopening movement of the arc valve 36, the linkage according to the present invention would fail to achieve the area schedule shown in FIG. 2 as the arc valve, lightweight but still massive, cannot be instantaneously accelerated to full speed angular velocity as the position of the convergent flap reaches $\theta_{min}$.

Figure 4:
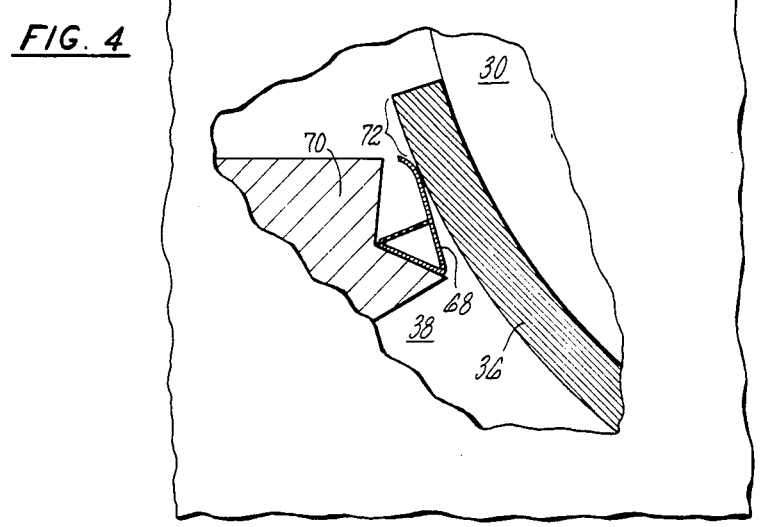
FIG. 4 shows a detailed sectional view of the sealing means disposed between the arc valve and the nozzle static structure.

This preopening range of motion is permitted by a forward portion of the arc valve 36 extending past the linear seal 68 between the forward nozzle static structure 70 and the arc valve 36 for sealing against flow of exhaust gases 12 into the reverser passage 38 when the valve 36 is in the closed orientation. This extended portion 72 as shown in FIG. 4 of the arc valve 36 allows the arc valve 36 to be pivoted aftward while the valve 36 is being accelerated to its full opening angular velocity. As the convergent flap 22 passes the $\theta_{min}$ angular position, the arc valve 36, having been pivoted rearwardly by the drive link 66 and crank 36a, disengages from the seal 68 and opens the flow area into the alternate reverse thrust flow passage 38 at the desired rate and time.

It will further be apparent that such timing and rate may vary as to the particular nozzle design, operating environment, gas tubine engine, etc. and that the relative movements of the convergent flap 22 and the corresponding arc valve 36 may be rescheduled by merely altering the shape of the cam race 50. Such modifications may thus be achieved without extensive redesign or remanufacture of the various components of the exhaust nozzle 10 as future engine developments and operating experience accumulate.

Although the method and linkage according to the present invention is shown as being operative in a symmetric 2-D nozzle arrangement wherein oppositely oriented convergent flaps 20, 22 and corresponding structures control and divert the exhaust gases 12, it should be appreciated that the flap and valve arrangement 22, 36 may be used singly to achieve thrust vectoring and area control without the need for a corresponding symmetric flap and valve arrangement. The method and linkage according to the present invention are thus not limited to use in the illustrated nozzle arrangement but rather may be used advantageously in a variety of configurations and applications without departing from the spirit and scope of the invention as defined by the hereinafter presented claims.

I claim:

1. A method for positioning a semi-cylindrical arc valve, the valve being pivotable about a common axis with a convergent flap in a thrust vectoring gas turbine engine exhaust nozzle, the convergent flap being selectively pivotable between a first angular position directing substantially all of the engine exhaust aftward from the nozzle and a second angular position blocking substantially all aftward flow of engine exhaust, the arc valve being pivotable about the common axis for admitting engine exhaust into an alternate, thrust reversing flow passage, said method for opening the arc valve being responsive to the movement of the convergent flap between the first position and the second position, and comprising the steps of:

(a) maintaining the arc valve in a static, closed condition wherein no exhaust gas is admitted to the thrust reversing flow passage responsive to movement of the convergent flap in a first range between the first angular position thereof and a third intermediate angular position, the third intermediate position being spaced apart from a fourth position not disposed within said first range, the fourth angular position corresponding to an orientation of the convergent flap defining a minimum exhaust nozzle outlet flow area for stable operation of the gas turbine engine;

(b) angularly accelerating the arc valve about the common axis from the static condition into a full speed condition wherein the angular speed of the arc valve is both proportional to and greater than the current angular speed of the convergent flap as the convergent flap moves in a second range between the third intermediate angular position and the fourth angular position, the accelerating arc valve remaining closed against the flow of engine exhaust into the thrust reversing flow passage; and (c) opening the arc valve at said full speed condition responsive to the movement of the convergent flap beyond the fourth angular position toward the second blocking angular position, the arc valve first opening to admit exhaust gases into the thrust reversing flow passage simultaneously with the convergent flap defining an aftward nozzle outlet flow area less than the minimum nozzle outlet flow area.

2. The method for opening an arc valve as defined in claim 1, wherein the step of accelerating the arc valve into the full speed condition includes the step of accelerating the arc valve to an angular velocity approximately twice the current angular velocity of the convergent flap.

3. A linkage arrangement for pivoting a semi-cylindrical arc valve about a common axis with a pivotable convergent flap and responsive to the movement of said flap, comprising:

a cam race, disposed in said convergent flap structure and pivotable about the common axis therewith, the race including a first dwell portion defining a path substantially equidistant and spaced apart from the common axis, a second acceleration portion adjacent the first dwell portion and defining a curved path generally toward the common axis, and a third action portion adjacent the second acceleration portion, and defining a path continuing generally toward the common axis;

a four bar linkage driven by a cam roller running in the cam race, including an arc valve crank secured to the arc valve and extending radially from the common axis, a drive link pivotably secured to the radially outer end of the arc valve drive crank at one end thereof and the cam roller at the other end thereof, the cam roller being received in the race for sequentially traversing the first, second, and third portions thereof, and a slave link, extending between the roller and a pivot support secured to a surrounding static nozzle structure for forming therewith a four bar linkage driven by the roller in the race for positioning the arc valve via the drive link and arc valve crank.

4. The linkage arrangement as defined in claim 3, further comprising:

a linear seal disposed between the semi-cylindrical arc valve and the nozzle static structure for preventing the circumferential flow of exhaust gases therebetween during movement of the roller along the first dwell portion of the cam race, the arc valve including a portion extended past the linear seal to maintain the arc valve closed against the flow of exhaust gas into the thrust reversing passage during movement of the arc valve in response to the movement of the roller along the second acceleration portion of the cam race.

* * * * *